Dec. 7, 1948.   D. M. WEIGEL   2,455,842
POWER TRANSMISSION MECHANISM
Filed March 30, 1945   3 Sheets-Sheet 1
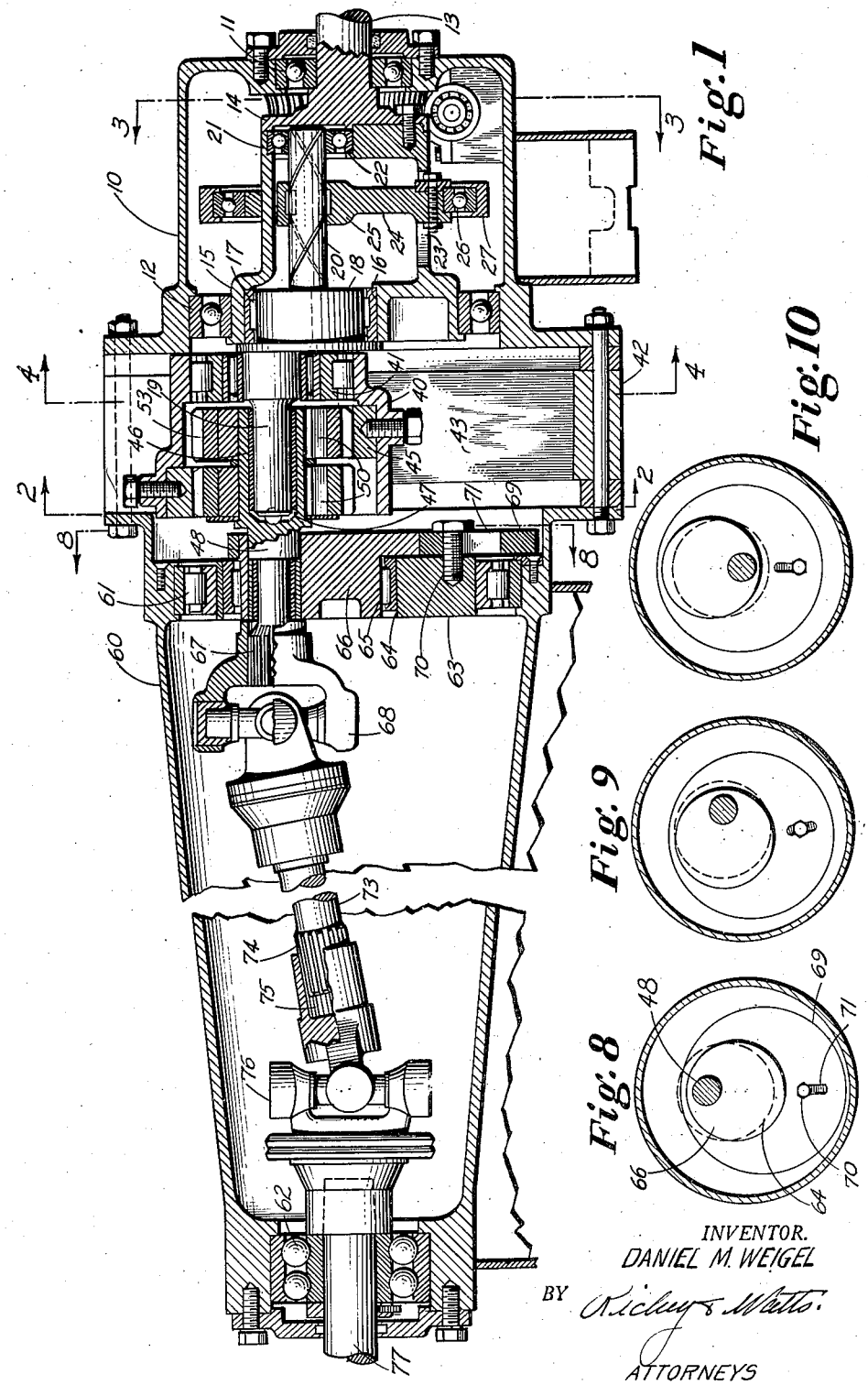
INVENTOR.
DANIEL M. WEIGEL
BY
ATTORNEYS Dec. 7, 1948.   D. M. WEIGEL   2,455,842
POWER TRANSMISSION MECHANISM
Filed March 30, 1945   3 Sheets-Sheet 2

INVENTOR.
DANIEL M. WEIGEL
BY *Richey & Watts*
ATTORNEYS

Dec. 7, 1948.    D. M. WEIGEL    2,455,842
POWER TRANSMISSION MECHANISM
Filed March 30, 1945    3 Sheets-Sheet 3
*Fig. 4*
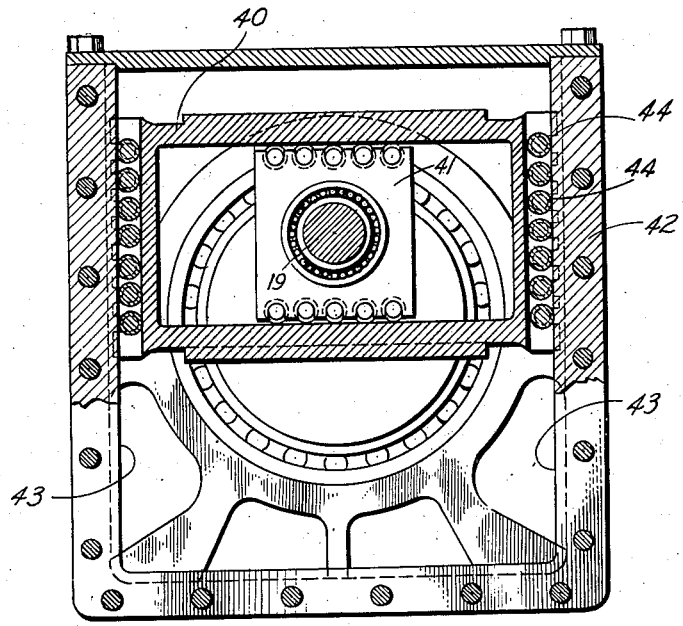
*Fig. 5*
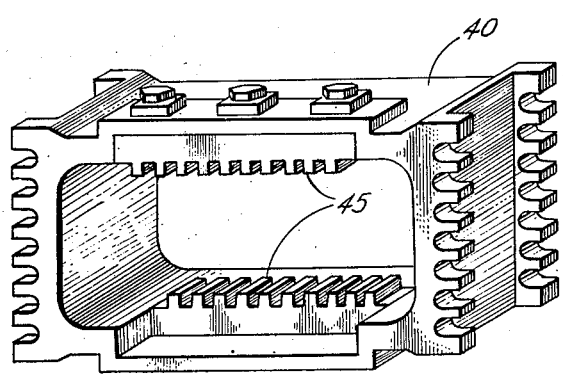
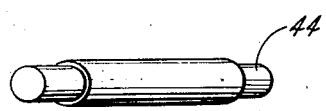
*Fig. 6*
INVENTOR.
DANIEL M. WEIGEL
BY *Richey & Watts*
ATTORNEYS Patented Dec. 7, 1948

2,455,842

UNITED STATES PATENT OFFICE 2,455,842

POWER TRANSMISSION MECHANISM

Daniel M. Weigel, Detroit, Mich.

Application March 30, 1945, Serial No. 585,589

7 Claims. (Cl. 74—121)

This invention relates broadly to power transmissions and more particularly to variable speed mechanisms of the type which accommodate a gradual change of speed ratios throughout the operative range thereof. The invention further relates to improvements in my copending applications, Serial No. 573,537, filed January 19, 1945, entitled "Transmission," and Serial No. 583,552, filed March 19, 1945, entitled "Variable speed transmission."

One of the objects of this invention is to provide a transmission having an infinitely variable speed reduction ratio throughout the range of operation thereof.

Another object is to provide a transmission in which the speed ratio is automatically adjusted so that the full power of input is transmitted to the output shaft at all speeds in the operative range.

Another object of this invention is to provide a mechanism for transmitting power to a driven shaft from a crank pin which describes an orbit of varying magnitude.

Further objects are realized by the construction of a transmission which is designed to facilitate the use of a manual control mechanism for adjustment of the speed ratio, which is readily susceptible of modification of structure to accommodate various sizes and applications, and which is efficient and simple of operation.

Other objects and advantages more or less ancillary to the foregoing and the manner in which all the various objects are realized will appear in the following description, which considered in connection with the accompanying drawings, sets forth the preferred embodiment of the invention.

Referring to the drawings wherein the preferred embodiment of the invention is illustrated:

Fig. 1 is a longitudinal sectional view of the improved transmission;

Fig. 4 is a transverse sectional view taken on line 4—4 of Fig. 1, illustrating the guide block for supporting the drive pin within the Scotch yoke;

Fig. 5 is a view in perspective of the Scotch yoke;

Fig. 6 is a perspective view of one of the Scotch yoke guide rollers;

Fig. 8 is a sectional view taken on line 8—8 of Fig. 1 showing the balance weight and cam assembly; and Figs. 9 and 10 are views similar to Fig. 8 illustrating the relation of parts in various positions of adjustment.

Figure 7:
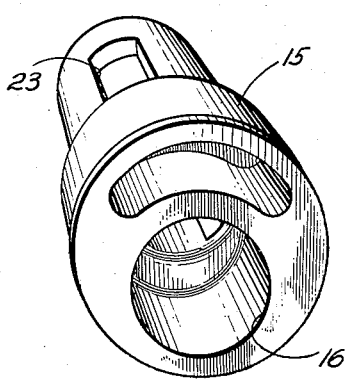
Fig. 7 is a perspective view of the input shaft drum.
Figure 2:
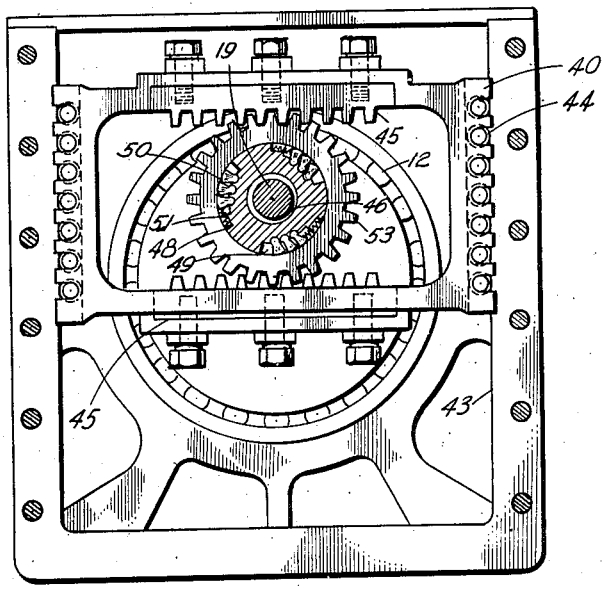
Fig. 2 is a transverse sectional view illustrating the Scotch yoke drive mechanism, the section being taken on line 2—2 of Fig. 1.

Referring first to Fig. 1, the transmission comprises a housing 10 machined for the seated engagement of anti-friction bearings 11 and 12. The input shaft 13 is supported in bearings 11 and terminates within the housing in a flange 14 formed for the support of a drum 15 (see also Fig. 7) which is journalled at its opposed end within the bearing 12. The end of drum 15 adjacent bearing 12 is bored for the reception of a needle bearing 17 which supports the hub 18 of a drive pin 19. The axis of rotation of the hub within the bearing 17 is eccentric to the common axis of rotation of the input shaft 13 and the drum 15. A stem 20 having a helical groove thereon extends axailly from the center of the hub 18 and protrudes into the drum 15, the end of said stem being supported in an anti-friction bearing 21 seated on a recess 22 in the outer end wall of said drum.

The driving portion of pin 19 is disposed in normal and eccentric relation to the hub 18. Rotation of the pin within the bearing 17 will therefore vary the distance between the axis of the drive pin 19 and the axis of rotation of the input shaft 13 and drum 15.

Figure 3:
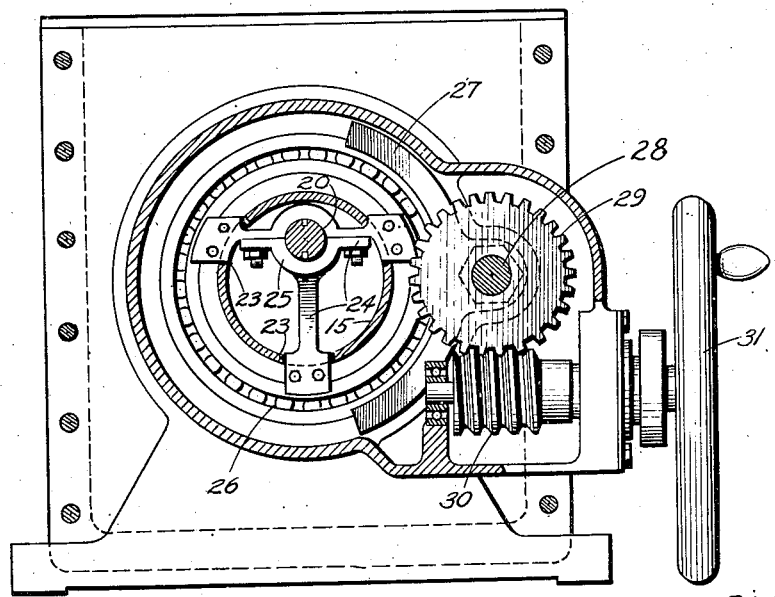
Fig. 3 is a transverse section taken on line 3—3 of Fig. 1 showing the manual control mechanism, the outer end of the input shaft drum being removed in the interest of clarity.

As will be seen in Figs. 1, 3 and 7 three longitudinal slots 23 are provided in the cylindrical wall of the drum 15 to accommodate the arms 24 of a helix follower or nut 25 which engages the helical groove in stem 20. The arms of the follower protrude through said slots and are secured to the inner race of an anti-friction bearing 26, the lengths of said arms being proportioned to sustain the bearing in concentric relation with the drum 15. A yoke 27 for shifting the follower 25 is mounted on a feed screw 28 supported in the housing 10. The yoke is engaged with the outer race of the bearing 26, the screw being retained from longitudinal movement within the housing by jam nuts engaged with the walls of the housing. The end of the screw 28 is provided with a worm wheel 29 meshed with a worm 30 machined in a cross shaft mounted in the housing 10 and controlled by a handwheel 31.

From the foregoing it will be seen that the rotational adjustment of the drive pin within the pin bearings 17 is effected by rotation of the handwheel 31, through the agencies of the worm 30, the worm wheel 29, the screw 28, the yoke 27, the bearing 26, the helix follower 25, and the helix in the stem 20. It will further be seen that the drum 15 is free to rotate on its own axis due to the concentric relation of the bearing 26 and said drum.

Referring now to Figs. 1, 2, 4 and 5 the drive pin 19 protrudes into a rectangular slide frame 40 and is supported therein by a guide block 41 mounted for horizontal sliding movement within said frame. A frame guide housing 42 is secured to the face of the input shaft housing 10, and is formed with guide rails 43 arranged to accommodate the vertical sliding movement of the slide frame during the rotation of the input shaft drum 15 and the drive pin 19 carried thereby. As will be seen in Figs. 4 and 5 the frame 40 is machined to support a plurality of anti-friction rollers 44 (Fig. 6) which engage the guide rails 43.

The drive pin 19 is moved in an orbital path by the rotation of the input shaft, the vertical component of such motion effecting the vertical reciprocation of said frame within the guide rails, and the horizontal component effecting the horizontal reciprocation of the guide block 41 within the frame 40.

Racks 45 are mounted on the upper and lower inner faces of frame 40 in offset relation with each other and normal to the medial axis of pin 19. The portion of pin 19 adjacent said racks is provided with a wear bushing 46 inserted in a pilot bearing 47 formed in the end of clutch shaft 48. The outer surface of said clutch shaft is machined with longitudinal grooves 49 to facilitate the pivotal support of a plurality of overrunning clutch pawls 50. Tangential springs 51 are provided for each group of contiguous pawls to maintain contact between the friction faces of said pawls and the inner surface of a rack pinion 53 constituting a clutch drum.

As will be seen in Fig. 1, the inner end of the shaft 48 is provided with a pair of pinions entrained respectively with the racks 45, each pinion operating a separate series of clutch pawls 50. Since each pinion is meshed with one rack only, the horizontal reciprocation of the pin 19 will effectuate a rotary oscillation of said pinions about the clutch shaft 48, the rotation of each pinion opposing the movement of the other. The oscillation of the pinions is translated into unidirectional rotation of clutch shaft 48 by the ratchet action of the clutch pawls 50. This type of overrunning clutch mechanism is the subject of my prior Patent No. 2,240,359.

A second housing 60 is bolted to the frame guide housing 42, and is provided with seats for the anti-friction bearings 61 and 62 in the opposed ends thereof, which, as shown, may be arranged in concentric relation with the axis of the input shaft 11. A plate 63 is journalled in the bearings 61 adjacent the frame guide 42, said plate having an eccentric hole 64 therethrough for the reception of pin bearings 65 which support a balance weight cam 66. The clutch shaft 48 is journalled in an eccentric hole in the balance cam and terminates within the housing 60 in an enlarged splined portion 67 engaged with a universal joint 68. The eccentricity of the hole 64 in plate 63 is equal to that of the seat 16 in the drum 15; likewise the center to center distance between the pin 19 and the hub 18 is equal to the distance between the shaft 48 and the hole 64 in the balance weight cam 66. Thus the rotary adjustment of the pin 19 as initiated by the handwheel control will effectuate a similar adjustment of the balance weight cam 66 within the plate 63.

As seen in Figs. 1, 8, 9 and 10 a balance plate 69 is journalled on the cam 66 and controlled thereby. A pin or bolt 70 is mounted in the plate 63 adjacent the outer edge thereof and protrudes through a radial slot 71 in the balance weight 69 to effect the rotation thereof in unison with the plate.

The universal joint 68 is coupled with a shaft 73 having a splined end portion 74 thereon for sliding engagement within a broached sleeve 75 on a second universal joint 76. A driven shaft 77 is supported in the bearings 62 and keyed to the universal joint 76.

Figs. 8, 9 and 10 illustrate the range of adjustment of the speed ratio of the mechanism, Fig. 8 showing the position of the parts during the optimum output speed of the device, Fig. 9 an intermediate position, and Fig. 10 the position in which no drive is effected. It will be noted that this adjustment may be effected by the handwheel control as heretofore described or by the governing action of the balance weight which opposes the weight of the revolving pin assembly.

In the latter case the manual control mechanism may either be disconnected or entirely eliminated from the structure. The operative characteristics of the governor action transmission are such that the output shaft revolves at the maximum speed consonant with the torque imposed thereon so that full power is transmitted at all speeds.

In operation, when the drive pin 19 is adjusted at a fixed distance from the axis of the input shaft, the drum 15 will rotate about its axis moving the pin 19 in an orbital path of movement. The shaft 48 and the universal joint 68 will follow a similar orbit, and the shaft 73 will move in a conical path having its apex at the center of the outer universal joint 76. The amplitude of the oscilation of pinions 53 is dependent upon the extent of horizontal translation thereof within the slide frame 40 which is, in turn, determined by the orbital radius of the drive pin 19. Hence the speed of rotation imparted to the shaft 48 by the overrunning clutches is biased by the speed of the input shaft and the position of adjustment of the drive pin.

Although the foregoing description is necessarily of a detailed character, in order that the invention may be completely set forth, it is to be understood that the specific terminology is not intended to be restrictive, and that various rearrangements of parts and modifications of detail may be resorted to without departing from the scope or spirit of the invention as herein claimed.

I claim:

1. A power transmission comprising a housing, a drive shaft journalled therein, an enlarged inner end on said shaft having an eccentric recess therein, a drive pin hub journalled in said recess, a drive pin thereon in eccentric relation therewith, a clutch shaft journalled on said pin, a pinion journalled on the clutch shaft, a slide frame circumambient said pinion and mounted for reciprocative movement within the housing, a gear rack in said frame engaged with said pinion, overrunning clutch pawls intermediate said pinion and said clutch shaft, a plate having an eccentric hole therethrough mounted for rotative movement in said housing, an eccentric cam journalled in said hole, a balance weight mounted on said cam, an eccentric bearing in said cam for the support of the clutch shaft, a driven shaft and articulate linkage intermediate the clutch shaft and the driven shaft.

2. A transmission comprising a housing, a drive shaft journalled therein, an eccentric bearing on the inner end of said shaft, a drive pin carried thereby, the driving portion of said pin being in eccentric relation to said bearing, a frame mounted for sliding movement within said housing, gear racks mounted in opposed staggered relation with each other in said frame, a clutch shaft journalled on the drive pin, pinions journalled on the clutch shaft and meshed with said racks, clutch elements intermediate said clutch shaft and said pinions for effecting unidirectional rotation of said shaft, a balance plate mounted in weight opposition to said drive pin, a driven shaft and linkage intermediate said clutch shaft and said driven shaft.

3. A power transmission embodying a housing, a drive shaft therein, a clutch shaft, an eccentric drive pin on said drive shaft journalled in the end of said clutch shaft, means for varying the eccentricity of the drive pin, clutch pawls pivotally supported on the clutch shaft, pinions on said shaft engaged by said pawls, a Scotch yoke surrounding said pinions, gear racks therein entrained respectively with said pinions, said racks being substantially parallel and on opposite sides of said clutch shaft, a fly weight mounted to rotate in unison with said drum and to oppose the weight of the drive pin and clutch shaft, universal joints coupled with said clutch shaft and a driven shaft coupled thereto.

4. A transmission comprising a drive shaft having an eccentric opening in the inner end thereof, a drive pin journalled in said opening eccentric thereto, a clutch shaft journalled on said pin, overrunning clutches on said shaft, pinions in driving relation to the said clutches, a Scotch yoke disposed in transaxial relation with said shaft, racks therein intermeshed with said pinions, a bearing support for said shaft adjacent said pinions, a driven shaft, and driving connections from said clutch shaft to said driven shaft.

5. A transmission comprising a housing, a drive shaft journalled therein, a bearing cage mounted on said shaft within said housing, said cage having a bore in the end thereof eccentric the medial axis of said shaft, a drive pin, an eccentric hub thereon journalled in said bore, a clutch shaft having an axial bore therein journalled on said pin, pinions on said clutch shaft, unidirectional clutches therein operatively engaged with said clutch shaft, a Scotch yoke mounted in said housing, racks therein engaged with said pinions, a disc having an eccentric opening therein journalled in said housing, a plate journalled in said opening, said plate having an eccentric hole therein constituting a journal bearing for said clutch shaft, a slidable counterbalance weight on said plate, a universal joint on said clutch shaft and an output shaft driven thereby.

6. A transmission comprising a housing, a drive shaft journalled therein, a bearing member having an eccentric bore in the end thereof mounted on said shaft, a rectangular frame mounted on said housing, a second rectangular frame mounted for vertical reciprocation in the first named frame, a third frame mounted for horizontal reciprocation in the second named frame, a drive pin, an eccentric hub thereon journalled in the eccentric bore in said bearing member, a clutch shaft journalled on said drive pin, a pair of pinions mounted on said clutch shaft in side by side relation, racks in the top and bottom rails of the second named frame enmeshed respectively with said pinions, overrunning clutches in said pinions engaged with said clutch shaft, means to vary the magnitude of the path of movement of said clutch shaft as guided by said second and third named frame, and an output shaft driven by said clutch shaft.

7. A transmission comprising a housing, a drive shaft journalled therein, said shaft having an eccentric bore in the end thereof, a drive pin, an eccentric hub thereon journalled in the eccentric bore in said shaft, a clutch shaft journalled on said drive pin, means on said hub to vary the eccentricity of the drive pin relative to the drive shaft, a Scotch yoke operatively connected with said clutch shaft, an overrunning clutch on said clutch shaft, means associated with the Scotch yoke and overrunning clutch to rotate said clutch shaft, a universal joint on said clutch shaft and an output shaft driven thereby.

DANIEL M. WEIGEL.

REFERENCES CITED

The following references are of record in the file of this patent:

UNITED STATES PATENTS

| Number | Name | Date |
|---|---|---|
| 685,834 | Green | Nov. 5, 1901 |
| 1,234,455 | Fox | July 24, 1917 |
| 1,572,360 | Petersson | Feb. 9, 1926 |
| 1,996,938 | Svensson | Apr. 9, 1935 |
| 2,005,227 | Johnson | June 18, 1935 |
| 2,036,624 | Garratt | Apr. 7, 1936 |
| 2,036,625 | Garratt | Apr. 7, 1936 |